(12) United States Patent
Nemeth et al.

(10) Patent No.: US 12,445,695 B2
(45) Date of Patent: Oct. 14, 2025

(54) CROSS-LAYER OPTIMIZATION IN XR-AWARE RAN TO LIMIT TEMPORAL ERROR PROPAGATION

(71) Applicant: MediaTek Singapore Pte. Ltd., Singapore (SG)

(72) Inventors: Jozsef Gabor Nemeth, Cambridge (GB); Abdellatif Salah, Cambridge (GB); Mohammed S Aleabe Al-Imari, Cambridge (GB); Chia-Chun Hsu, Hsinchu (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 18/690,397

(22) PCT Filed: Sep. 29, 2022

(86) PCT No.: PCT/CN2022/122656
§ 371 (c)(1),
(2) Date: Mar. 8, 2024

(87) PCT Pub. No.: WO2023/051707
PCT Pub. Date: Apr. 6, 2023

(65) Prior Publication Data
US 2024/0380953 A1  Nov. 14, 2024

Related U.S. Application Data

(60) Provisional application No. 63/250,280, filed on Sep. 30, 2021.

(51) Int. Cl.
*H04N 21/81* (2011.01)
*H04L 47/2416* (2022.01)
(Continued)

(52) U.S. Cl.
CPC ....... *H04N 21/816* (2013.01); *H04L 47/2416* (2013.01); *H04L 47/56* (2013.01);
(Continued)

(58) Field of Classification Search
CPC .............. H04N 21/816; H04N 21/6473; H04L 47/2416; H04L 47/56; H04W 28/0236; H04W 28/268
See application file for complete search history.

(56) References Cited

U.S. PATENT DOCUMENTS

2019/0364492 A1  11/2019  Azizi et al.
2020/0336435 A1  10/2020  Zhang et al.
(Continued)

FOREIGN PATENT DOCUMENTS

CN   101179773 A   5/2008
WO   2020/011350 A1  1/2020
(Continued)

OTHER PUBLICATIONS

Extended European Search Report dated Mar. 10, 2025, issued in application No. EP 22875088.1.
(Continued)

*Primary Examiner* — Nicholas T Corbo
(74) *Attorney, Agent, or Firm* — McClure, Qualey & Rodack, LLP

(57) ABSTRACT

A network communicates an extended reality (XR) traffic with a user equipment (UE) with frame error concealment to limit a duration of temporal error propagation. The network also transmits a report of failure or a request for retransmission to the UE in an event of a network transmission failure.

17 Claims, 7 Drawing Sheets

(51) Int. Cl.
  *H04L 47/56* (2022.01)
  *H04N 21/647* (2011.01)
  *H04W 28/02* (2009.01)
  *H04N 19/30* (2014.01)

(52) U.S. Cl.
  CPC .... *H04N 21/6473* (2013.01); *H04W 28/0236* (2013.01); *H04W 28/0268* (2013.01); *H04N 19/30* (2014.11)

(56) References Cited

U.S. PATENT DOCUMENTS

2020/0383004 A1  12/2020  Hande et al.
2021/0037250 A1*  2/2021  Makar .................. H04N 19/107

FOREIGN PATENT DOCUMENTS

WO   WO-2020060984 A1 *  3/2020  .......... G06T 19/006
WO      2021021550 A1     2/2021

OTHER PUBLICATIONS

Chiew, T-K., et al.; "Error-resilient low-delay H.264/802.11 transmission via cross-layer coding with feedback channel;" Visual Communications and Image Processing; Jul. 2005; pp. 1868-1879.
International Search Report and Written Opinion dated Dec. 15, 2022, issued in application No. PCT/CN2022/122656.
Qualcomm Incorporated; "Potential Enhancements for XR (R1-2104704);" 3GPP TSG RAN WG1 #105-e; May 2021; pp. 1-12.
Qualcomm Incorporated; "Potential Enhancements for XR (R1-2107377);" 3GPP TSG RAN WG1 #106-e; Aug. 2021; pp. 1-12.
Mediatek Inc.; "Further Potential XR Enhancements (R1-2109556);" 3GPP TSG RAN WG1 Meeting #106bis-e; Oct. 2021; pp. 1-7.
Mediatek Inc.; "Further Potential XR Enhancements (R1-2112299);" 3GPP TSG RAN WG1 Meeting #107-e; Nov. 2021; pp. 1-7.
VIVO; "Discussion on XR Applications, traffic model and evaluation methodologies (R1-2007698);" 3GPP TSG RAN WG1 #103-e; Nov. 2020; pp. 1-20.
Chinese language office action dated Jul. 21, 2023, issued in application No. TW 111137242.
International Search Report and Written Opinion dated Nov. 30, 2022, issued in application No. PCT/CN2022/122659.
Interdigital Inc.; "Discussion on potential enhancements for XR (R1-2107537);" 3GPP TSG RAN WG1 #106-e; Aug. 2021; pp. 1-6.
Chinese language office action dated Feb. 5, 2024, issued in application No. TW 111137241.
"3GPP TS 23.503 V17.2.0; Technical Specification Group Services and System Aspects; Policy and charging control framework for the 5G System (5GS); Stage 2 (Release17);" Sep. 2021; pp. 1-141.
"3GPP TS 23.501 V17.2.0; Technical Specification Group Services and System Aspects; System architecture for the 5G System(5GS); Stage 2 (Release17);" Sep. 2021; pp. 1-542.
3GPP TR 26.928 V16.1.0; Technical Specification Group Services and System Aspects; Extended Reality (XR) in 5G (Release 16); Dec. 2020; pp. 1-131.

* cited by examiner

CROSS-LAYER OPTIMIZATION IN XR-AWARE RAN TO LIMIT TEMPORAL ERROR PROPAGATION

CROSS REFERENCE TO RELATED PATENT APPLICATION(S)

The present disclosure is part of a non-provisional application claiming the priority benefit of U.S. Patent Application No. 63/250,280, filed 30 Sep. 2021, the content of which herein being incorporated by reference in its entirety.

TECHNICAL FIELD

The present disclosure is generally related to mobile communications and, more particularly, to methods and apparatus for cross-layer optimization in extended reality (XR)-aware radio access network (RAN) to limit temporal error propagation in mobile communications.

BACKGROUND

Unless otherwise indicated herein, approaches described in this section are not prior art to the claims listed below and are not admitted as prior art by inclusion in this section.

In wireless communications, such as mobile communications under the $3^{rd}$ Generation Partnership Project (3GPP) specification(s) for $5^{th}$ Generation (5G) New Radio (NR), further enhancements are required to ensure 5G support of latency-sensitive throughput-sensitive applications. One emerging trend is the rise of 5G applications for XR, which may include virtual reality (VR), augmented reality (AR) and mixed reality (MR). Coordination and sharing of information between an XR server, multi-access edge computing (MEC) and a RAN is required to further optimize end-to-end (E2E) performance including throughput, latency and reliability. However, there remain issues that need to be addressed for cross-layer optimization in a XR-aware RAN. Such issues include, for example, the need for optimization of a turnaround time from demand to arrival of I-frame(s), the need for optimization of multi-layer-encoding multiplexing, and the need for optimization of quality of service (QOS) for late frame decoding.

Therefore, there is a need for a solution of cross-layer optimization in XR-aware RAN to limit temporal error propagation in mobile communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the issue(s) described herein. More specifically, various schemes proposed in the present disclosure are believed to provide solutions involving cross-layer optimization in XR-aware RAN to limit temporal error propagation in mobile communications. Under the various proposed schemes, frame error concealment may achieve better quality of experience (QoE) and/or relaxation of frame error rate (FER) requirements by limiting the duration of temporal error propagation. It is believed that implementation of various schemes proposed herein may achieve optimization of I-frame-on-demand, multi-layer-encoding, and late-frame handling.

In one aspect, a method may involve a network communicating an XR traffic with a user equipment (UE) with frame error concealment to limit a duration of temporal error propagation. The method may also involve the network transmitting a report of failure or a request for retransmission to the UE in an event of a network transmission failure.

In one aspect, a method may involve a network communicating an XR traffic with a UE with frame error concealment. The method may also involve the network performing parameter configuration of at least two sets of parameters for each QoS flow comprising: (i) a first set of parameters specifying a guarantee for a best case of packet delivery parameters comprising a tighter packet delay budget (PDB) with a higher or relaxed bound on a PDB violation probability; and (ii) a second set of parameters specifying a guarantee for a worst case of packet delivery parameters comprising a larger PDB with a lower or stricter bound on the PDB violation probability.

In yet another aspect, an apparatus implementable in a network may include a transceiver and a processor coupled to the transceiver. The transceiver may be configured to communicate with one or more network nodes of the network. The processor may communicate, via the transceiver, an XR traffic with a UE with frame error concealment to limit a duration of temporal error propagation. The processor may also transmit, via the transceiver, a report of failure or a request for retransmission to the UE in an event of a network transmission failure.

It is noteworthy that, although description provided herein may be in the context of certain radio access technologies, networks and network topologies such as 5G/NR mobile communications, the proposed concepts, schemes and any variation(s)/derivative(s) thereof may be implemented in, for and by other types of radio access technologies, networks and network topologies such as, for example and without limitation, Long-Term Evolution (LTE), LTE-Advanced, LTE-Advanced Pro, Internet-of-Things (IoT), Narrow Band Internet of Things (NB-IoT), Industrial Internet of Things (IIOT), vehicle-to-everything (V2X), and non-terrestrial network (NTN) communications. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to cross-layer optimization in XR-aware RAN to limit temporal error propagation in mobile communications. According to the present disclosure, a number of possible solutions may be implemented separately or jointly. That is, although these possible solutions may be described below separately, two or more of these possible solutions may be implemented in one combination or another.

Figure 1:
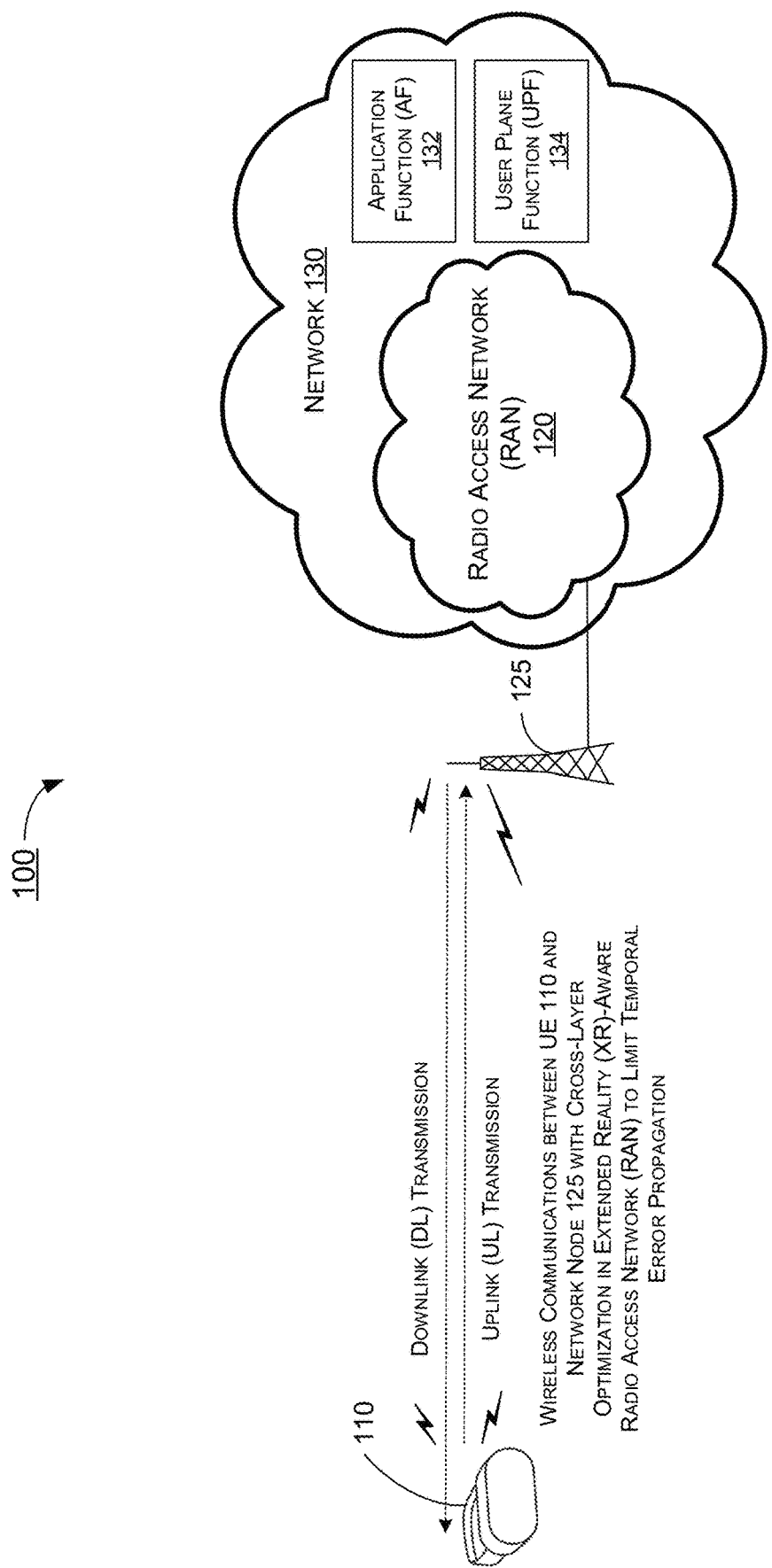
FIG. 1 is a diagram of an example network environment in which various proposed schemes in accordance with the present disclosure may be implemented.

FIG. 1 illustrates an example network environment 100 in which various solutions and schemes in accordance with the present disclosure may be implemented. FIG. 2~FIG. 7 illustrate examples of implementation of various proposed schemes in network environment 100 in accordance with the present disclosure. The following description of various proposed schemes is provided with reference to FIG. 1~FIG. 7.

Referring to FIG. 1, network environment 100 may involve a UE 110 in wireless communication with a RAN 120 (e.g., a 5G NR mobile network or another type of network such as an NTN). UE 110 may be in wireless communication with RAN 120 via a base station or network node 125 (e.g., an eNB, gNB or transmit-receive point (TRP)). RAN 120 may be a part of a network 130 which may also include an Application Function (AF) 132 and a User Plane Function (UPF) 134, among other functions described below. In network environment 100, UE 110 and RAN 120 (via network node 125) may implement various schemes pertaining to cross-layer optimization in XR-aware RAN to limit temporal error propagation in mobile communications, as described below. It is noteworthy that, although various proposed schemes, options and approaches may be described individually below, in actual applications these proposed schemes, options and approaches may be implemented separately or jointly. That is, in some cases, each of one or more of the proposed schemes, options and approaches may be implemented individually or separately. In other cases, some or all of the proposed schemes, options and approaches may be implemented jointly.

Figure 2:
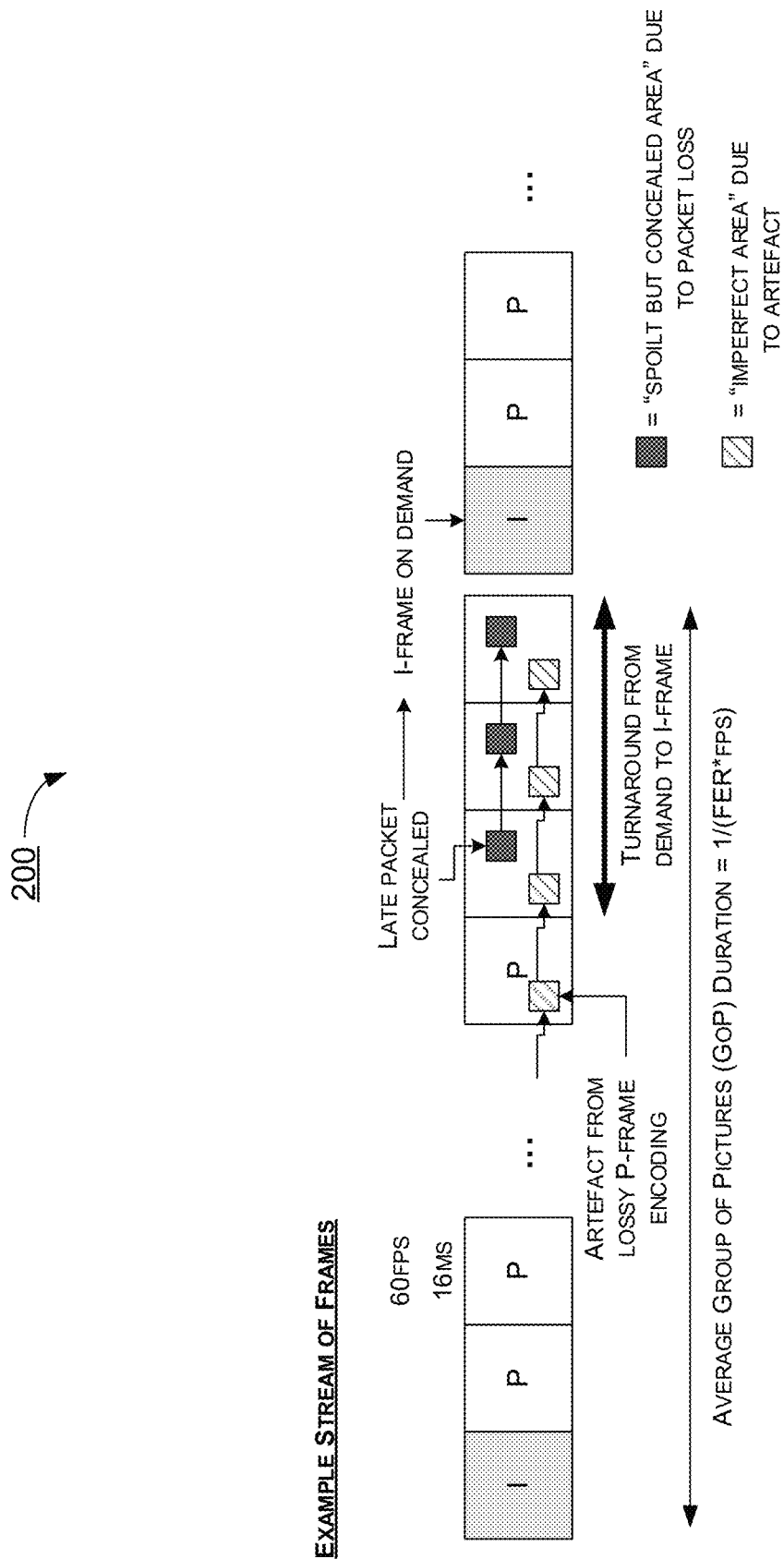
FIG. 2 is a diagram of an example scenario under a proposed scheme in accordance with the present disclosure.

FIG. 2 illustrates an example scenario 200 under a proposed scheme in accordance with the present disclosure. Specifically, scenario 200 pertains to an example of streams of frames. In scenario 200, with I-frame-on-demand, error(s) may propagate to subsequent frames until I-frame(s) arrive(s). Under the proposed scheme, the turnaround time from demand (e.g., by an XR application executed on UE 110) to I-frame arrival may be optimized. For instance, in the case of group of pictures (GoP) with I-frame-on-demand, the turnaround time from a P-frame failure to I-frame arrival may be kept below a certain limit (e.g., two frame intervals) then a certain percentage (e.g., 2%) of P-frames containing errors with video frame FER may be 1%.

Under the proposed scheme, with respect to I-frame-on-demand enhancement, an I-frame in the downlink (DL) direction may be demanded by a RAN (e.g., RAN 120) or UE110 (e.g., layer 1 (L1) of UE 110) upon occurrence of one or more conditions. The one or more conditions may include, for example: (i) failure of a last retransmission (Re-Tx) occasion; and (ii) failure of the last-before Re-Tx occasion. It is believed that this approach may save or otherwise reduce the delay ensued by a client application (herein interchangeably referred to as "Client") and the uplink (UL) resource(s). The demand may be processed at a high priority by an application server.

Under a proposed scheme, with respect to reporting of failure and request for retransmission by RAN, enhancements may be made to video frame, video slice, video block and application data unit (ADU) on demand. For instance, UE 110 (e.g., L1 of UE 110) or RAN 120 may transmit a report on a failure in transmission of video frame(s), video slice(s), video block(s) and/or ADU(s) to one or more higher layers, a UE application layer, an XR server and/or a video coder-decoder (codec). Additionally, UE 110 (e.g., L1 of UE 110) or RAN 120 may transmit a request for a retransmission and/or new transmission of a to video frame, video slice, video block and/or ADU from the one or more higher layers, UE application layer, XR server and/or video code following a RAN transmission failure. The report and request may be made when the last Re-Tx occasion fails. Alternatively, or additionally, the report and request may be made when the last-before Re-Tx occasion fails. This approach may save otherwise reduce the delay ensured by the Client (e.g., an XR application executed on an application layer of UE 110) and UL resource(s). The demand may be processed at a high priority by one or more AF servers. Moreover, the request and report may be made when transmission of a certain number of ADUs and/or Internet Protocol (IP) packets results in failure. It is noteworthy that the "last" and "last-before" retransmission occasions mentioned above may be defined in several ways for each radio packet, with respect to the PDB of the particular packet or the start of the frame decoding or the start of the processing of ADU that the packet belongs to or the expiry of ADU Delay Budget, ADU Deadline, video frame delay budget and/or video-slice delay budget.

Under the proposed scheme, with respect to RAN anticipating resource configuration for requests, RAN 120 may have awareness about packet failures and may predict or otherwise expect a request from the UE application layer of UE 110 to trigger I-frame retransmission. For instance, RAN 120 may configure or schedule UE 110 with resource(s) for the I-frame request. The UE application layer on UE 110 may label the I-frame request for awareness at L1 of UE 110. The I-frame request may be treated with a higher priority at L1 of UE 110. RAN 120 may schedule enough and early resource(s), low modulation-and-coding scheme (MCS) and/or low coding rate/modulation to ensure higher reliability and low latency for transmission of the I-frame request.

Figure 3:
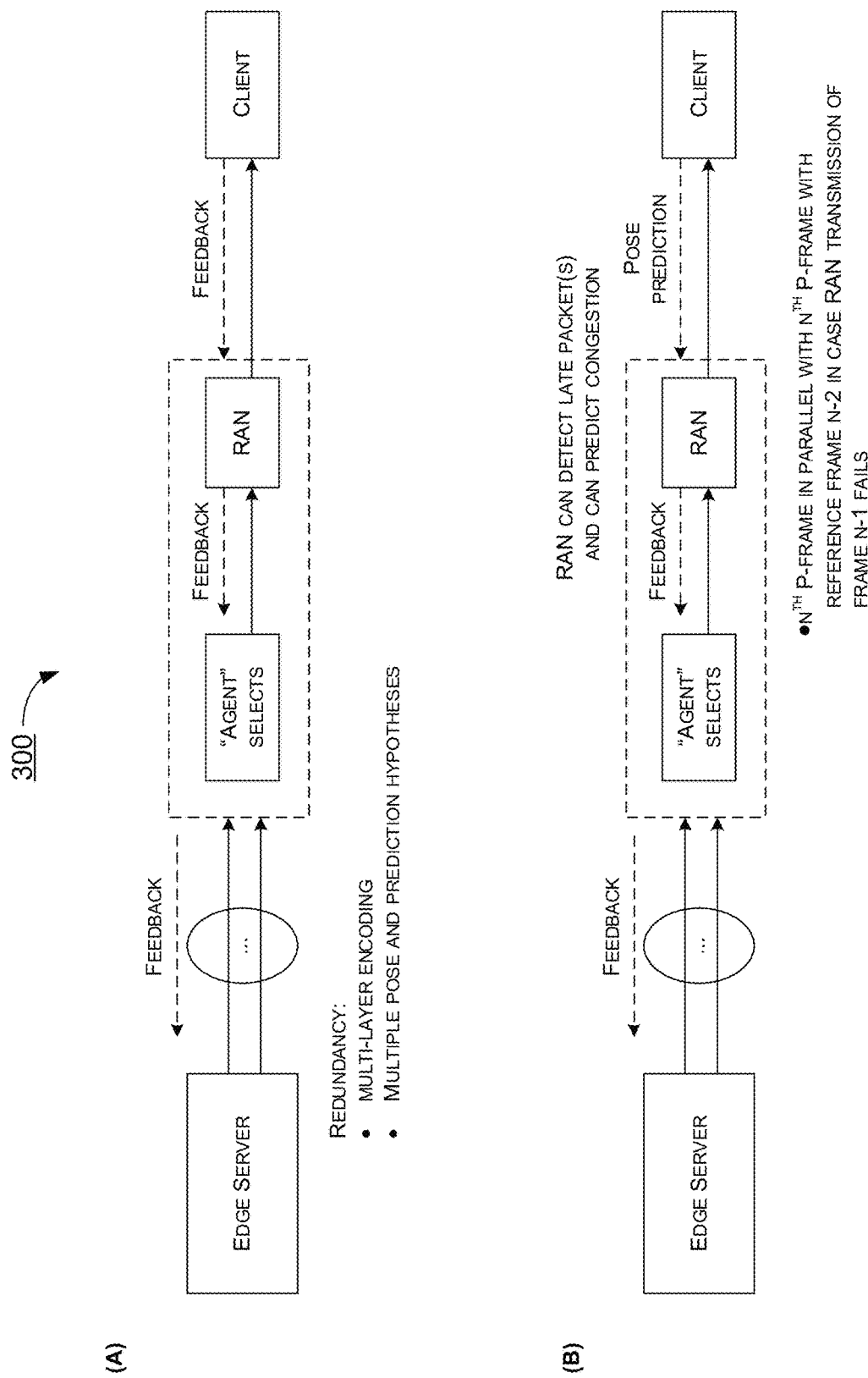
FIG. 3 is a diagram of an example scenario under a proposed scheme in accordance with the present disclosure.

FIG. 3 illustrates an example scenario 300 under a proposed scheme in accordance with the present disclosure. Specifically, scenario 300 pertains to an example of multi-layer-encoding multiplexing. In scenario 300, multi-layer encoding may be affordable over the Internet but not over RAN 120. Under the proposed scheme, with respect to multi-layer-encoding multiplexing, the Basic and Enhanced layers may be transmitted in DL over a wired network. RAN 120 may omit the Basic layer and only transfer the Enhanced layer as long as neither frame error nor congestion occurs. If either frame error or congestion occurs, a decision may be made to possibly omit the Enhanced layer and only transmit the Basic layer until the system can return to normal. Under the proposed scheme, multiplexing may be extended to further use cases such as, for example and without limitation, multiple-pose prediction hypotheses. Referring to part (A) of FIG. 3, under the proposed scheme, there may be some redundancy in traffics (e.g., multi-layer encoding and multiple-pose prediction hypotheses). An "agent" function (herein interchangeably referred to as "Agent") may be utilized to handle traffic with lower complexity relative to that handled by AF server(s), with low extra latency. In some implementations, the Agent may be a part of distributed AF server(s), although the platform may be provided by an infrastructure vendor. In other implementations, the Agent may be a part of a RAN (e.g., RAN 120). In such cases, QoS flows may map to indices, and event may switch between indices. As an example of event pair, the Agent may switch to an alternative stream while I-frame arrives in response to a request previously sent, then switch back. As another example, a Client (e.g., an XR application executed on UE 110) may send an index/indices based on a updated pose prediction (e.g., prediction of the pose of a user of UE 110, and variations in the pose, when using an XR application executed on UE 110).

Under the proposed scheme, for multiplexing between Basic and Enhanced layers, the Agent may be a part of a 5th Generation System (5GS). In such cases, an AF server may render and encode two (or multiple) versions of video frames, ADUs and/or video slices transmitted in the DL direction, identified by index_1 and index_2, respectively. For example, index_1 may be used to identify the Basic layer while index_2 may be used to identify the Enhanced layer. Based on success in reception and decoding of a current video frame, ADU or video slice (not precluding other events such as arrival of I-frame on demand or an intra-refresh for a specific video slice or a similar refresh event for an ADU, or history of events), the Client may decide on index_1 or index 2 for selection of the next video frame, ADU or video slice. The selected index may be sent to the Agent in the UL direction. Accordingly, the Agent may receive the selected index from the Client for the next pair of video frames, ADUs or video slices. When the pair of video frames, ADUs or video slices arrive at the Agent, the Agent may select one of them by using the index received from the Client.

Part (B) of FIG. 3 pertains to an example of multi-layer-encoding multiplexing with multiple resolutions (e.g., Enhanced versus Basic layers) and multiple pose predictions. Under the proposed scheme, XR roundtrip time (RTT) relaxation may rely on pose prediction. Pose prediction accuracy and reliability may fluctuate over UEs and over time. The QoE may benefit from triggering server-side error concealment when a prediction is uncertain. The server-side error concealment may be rendered with RAN assistance. In an event that network resources from an Edge of the network to RAN are abundant, then multiple versions of the same frame may be transmitted to RAN in the DL direction and selected based on RAN parameters or Client application parameters.

Under the proposed scheme, multiplexing between pose prediction hypotheses may be performed. In such cases, the Agent may be a part of the 5GS. For instance, in the UL directly, the Client may send two (or more) pose predictions to an AF server, identified by index_1 and index_2, respectively. The AF server may render and encode two (or more) video frames, ADUs and/or video slices that are transmitted in the DL direction, identified by index_1 and index_2, respectively. Based on up-to-date pose prediction, the Client may select the more accurate or preferable pose prediction(s) reported above and, based on the selection decision, the Client may send and index (e.g., index_1 and index_2) to the Agent (as shown in FIG. 3) through UL transmission. Accordingly, the Agent may receive the index from the Client for a next pair of video frames, ADUs and/or video slices. When the pair of video frames, ADUs and/or video slices arrive at the Agent, the Agent may select one of them using the index received from the Client. It is noteworthy that each radio packet may be mapped to a respective one ADU. Moreover, two trajectories for a given pose may be multiplexed. Furthermore, the selection may be controlled based on ADUs rather than per packets.

Under a proposed scheme in accordance with the present disclosure with respect to late-frame decoding, dropping late frames may produce error propagation, whereas a chain of decoding may be recovered. Under the proposed scheme, regarding late-frame decoding, certain UEs may be capable of recovering the chain of decoding, and may thereby prevent temporal error propagation, after a packet misses its PDB deadline. Repeated late decoding may also be performed to re-use partial results of previous decoding. Alternatively, or additionally, the decoding may await late packets, and interpolation methods may be applied by UE 110 to refresh a displayed video scene. Under the proposed schemes, two PDBs may be utilized. For example, a first PDB (PDB_1) may be the delay budget used to avoid late decoding, and a second PDB (PDB_2) may be the delay budget used to recover decoding chain. Then, QoS may be captured by Prob (delay>PDB_i)<P_ii for i=1, 2 (e.g., two {PDB, P} pair).

Figure 4:
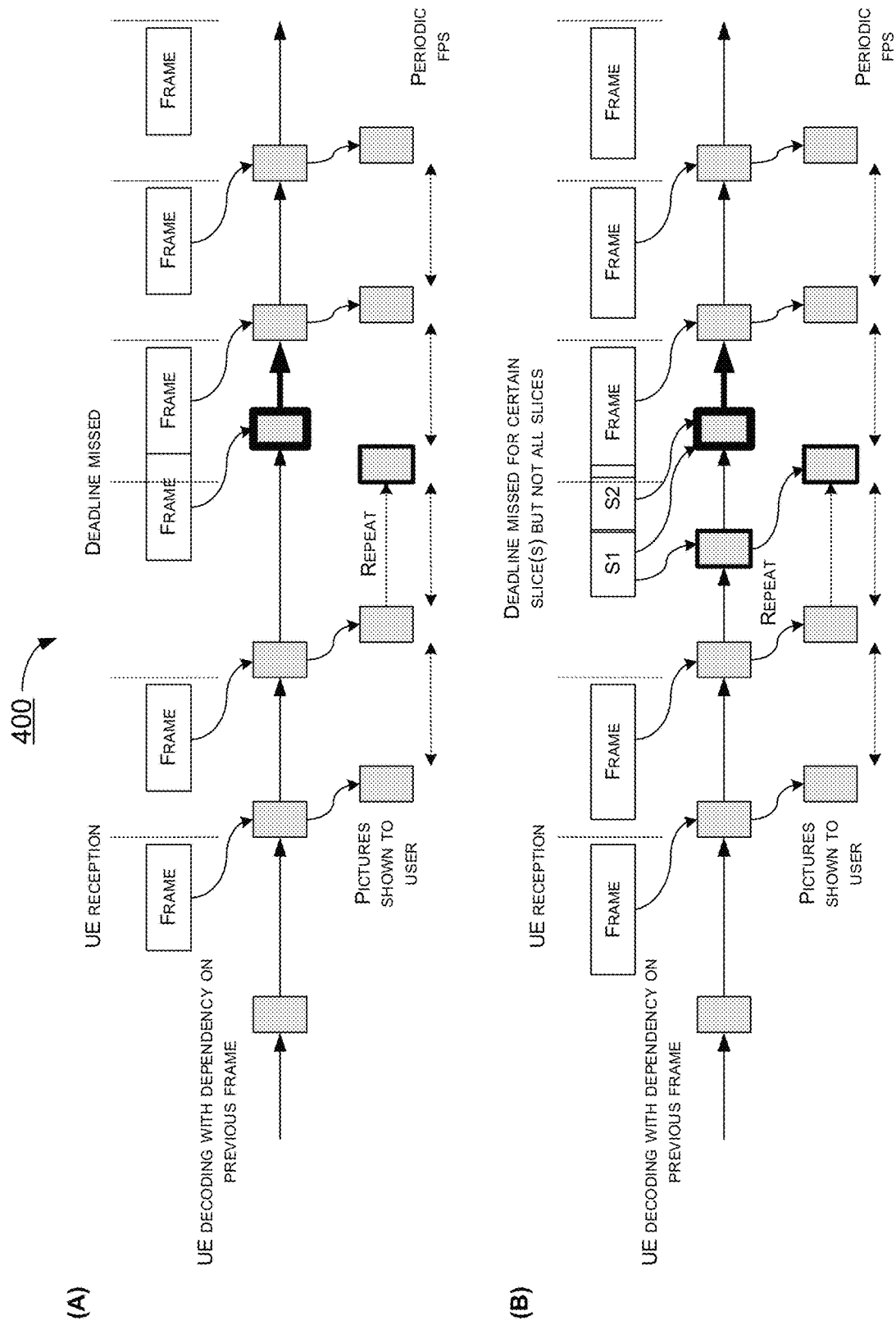
FIG. 4 is a diagram of an example scenario under a proposed scheme in accordance with the present disclosure.

FIG. 4 illustrates an example scenario 400 under a proposed scheme in accordance with the present disclosure. Specifically, scenario 400 pertains to an example of late-frame decoding and late-slice decoding. In scenario 400, a frame that fails its deadline may still be transmitted after its deadline, and thus a sequence of frames may remain intact. Advantageously, there would be no error propagation caused to further frames. Referring to part (A) of FIG. 4, with respect to late-frame decoding, UE 110 may decode all subsequent frames, provided that UE 110 may start and finish decoding of a late frame and a subsequent frame arrives after a single frame interval. Referring to part (B) of FIG. 4, with respect to late-slice decoding, segmentation of frames may be performed with the possibility that some slices may meet the deadline of a frame while other slices may not. The decoding may be repeated when full information arrives. Under the proposed scheme, some of the slices having an impact on spatial error propagation may be prioritized higher than other slices that do not have such an impact.

Under a proposed scheme in accordance with the present disclosure, ADUs may be used as a general terminology for a specific grouping of packets by the Application Function that is shared with a 5GS network. The AF and 5GS may use the packet-to-ADU mapping in QoS services and flows, which may be based on ADUs instead of packets. Under the proposed scheme, scheduling decisions may be made with awareness of ADU time budgets or ADU deadlines for delivery, and all packets in an ADU may map to a same deadline. Different ADUs may have different deadlines. Alternatively, or additionally, all packets in an ADU may map to a same reliability level. Different ADUs may have different reliability levels. Alternatively, or additionally, all packets in an ADU may map to a same throughput QoS requirement. Different ADUs may have different throughputs. Alternatively, or additionally, each ADU may map to a tuple of QoS parameters which may be common to all packets within an ADU but may differ across ADUs. Tuples may have a hierarchical structure. For example, a tuple may include {deadline_1, reliability_1, deadline_2, reliability_2, throughput} for defining soft-real-time requirements by two deadlines and respective error probabilities. ADUs may be organized hierarchically into larger units, which may be termed super-ADUs. ADUs within a super-ADU may change their QoS parameters and QoS flows together or may be handled together in multiplexing super-ADUs. Under the proposed scheme, packets belonging to a frame may be divided into several ADUs, and the frame may be a super-ADU. For example, the frame may include two ADUs, namely a first ADU (ADU_1) and a second ADU (ADU_1). The first ADU containing all radio packets carrying motion vectors. The second ADU may contain all other radio packets belonging to the frame. The reliability requirement may be higher for ADU_1 than for ADU_2. The deadline may be earlier for ADU_1 than for ADU_2.

Under the proposed scheme, ADUs may gather radio packets based on other attributes such as, for example and without limitation: I-frame versus P-frame, field of view (FoV), game control commands, haptic sensors data, in-game voice traffic, video feed, and so on. The system may define different ADUs based on different aspects, for each aspect, a radio packet may map to exactly one ADU, but a radio packet may be mapped to an ADU based on more than one aspect. It is noteworthy that all the proposed schemes described above may be applied to ADUs rather than radio packets. As such, less individual parameters may need to be conveyed between AF and 5GS. For instance, each radio packet may carry an ADU identifier in its header and a control link may convey common parameters between AF and 5GS such as, for example and without limitation, ADU deadline and/or ADU reliability.

Under the proposed scheme, QoS service levels may be specified in terms of ADU parameters. The parameters may include, for example and without limitation, ADU delay budget starting from arrival of the last packet within the ADU at the UPF (e.g., UPF 134), an ADU maximum size (e.g., X=99%) for X-tile of ADU size, a minimum inter-arrival time of ADUs based on latest packet in each ADU, an ADU relative arrival phase compared to other ADUs, and an ADU reliability requirement.

Illustrative Implementations

Figure 5:
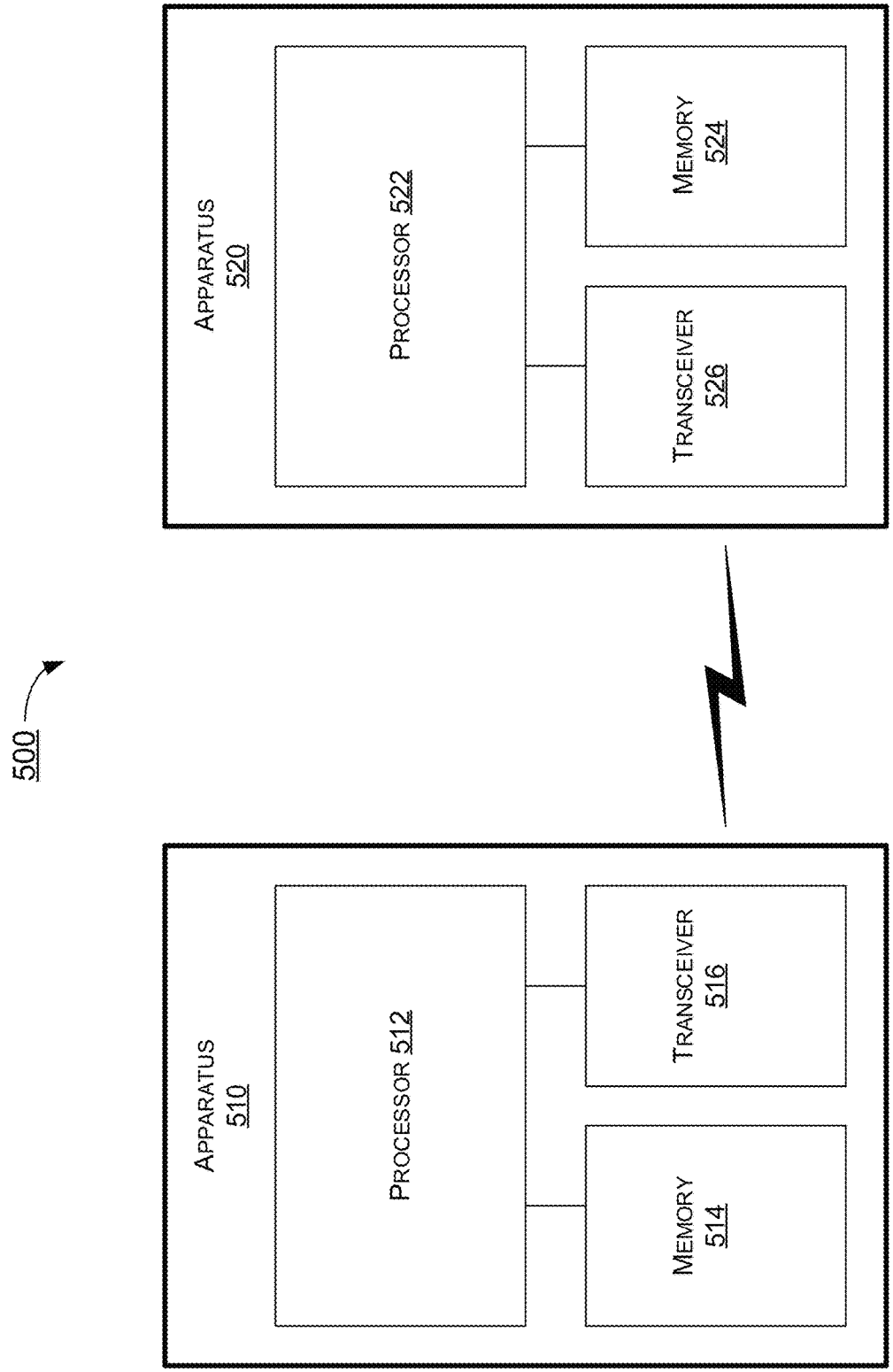
FIG. 5 is a block diagram of an example communication system in accordance with an implementation of the present disclosure.

FIG. 5 illustrates an example communication system 500 having at least an example apparatus 510 and an example apparatus 520 in accordance with an implementation of the present disclosure. Each of apparatus 510 and apparatus 520 may perform various functions to implement schemes, techniques, processes and methods described herein pertaining to cross-layer optimization in XR-aware RAN to limit temporal error propagation in mobile communications, including the various schemes described above with respect to various proposed designs, concepts, schemes, systems and methods described above, including network environment 100, as well as processes described below.

Each of apparatus 510 and apparatus 520 may be a part of an electronic apparatus, which may be a network apparatus or a UE (e.g., UE 110), such as a portable or mobile apparatus, a wearable apparatus, a vehicular device or a vehicle, a wireless communication apparatus or a computing apparatus. For instance, each of apparatus 510 and apparatus 520 may be implemented in a smartphone, a smart watch, a personal digital assistant, an electronic control unit (ECU) in a vehicle, a digital camera, or a computing equipment such as a tablet computer, a laptop computer or a notebook computer. Each of apparatus 510 and apparatus 520 may also be a part of a machine type apparatus, which may be an IoT apparatus such as an immobile or a stationary apparatus, a home apparatus, a roadside unit (RSU), a wire communication apparatus or a computing apparatus. For instance, each of apparatus 510 and apparatus 520 may be implemented in a smart thermostat, a smart fridge, a smart door lock, a wireless speaker or a home control center. When implemented in or as a network apparatus, apparatus 510 and/or apparatus 520 may be implemented in an eNodeB in an LTE, LTE-Advanced or LTE-Advanced Pro network or in a gNB or TRP in a 5G network, an NR network or an IoT network.

In some implementations, each of apparatus 510 and apparatus 520 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. In the various schemes described above, each of apparatus 510 and apparatus 520 may be implemented in or as a network apparatus or a UE. Each of apparatus 510 and apparatus 520 may include at least some of those components shown in FIG. 5 such as a processor 512 and a processor 522, respectively, for example. Each of apparatus 510 and apparatus 520 may further include one or more other components not pertinent to the proposed scheme of the present disclosure (e.g., internal power supply, display device and/or user interface device), and, thus, such component(s) of apparatus 510 and apparatus 520 are neither shown in FIG. 5 nor described below in the interest of simplicity and brevity.

In one aspect, each of processor 512 and processor 522 may be implemented in the form of one or more single-core processors, one or more multi-core processors, or one or more CISC or RISC processors. That is, even though a singular term "a processor" is used herein to refer to processor 512 and processor 522, each of processor 512 and processor 522 may include multiple processors in some implementations and a single processor in other implementations in accordance with the present disclosure. In another aspect, each of processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 512 and processor 522 is a special-purpose machine specifically designed, arranged and configured to perform specific tasks including those pertaining to cross-layer optimization in XR-aware RAN to limit temporal error propagation in mobile communications in accordance with various implementations of the present disclosure.

In some implementations, apparatus 510 may also include a transceiver 516 coupled to processor 512. Transceiver 516 may be capable of wirelessly transmitting and receiving data. In some implementations, transceiver 516 may be capable of wirelessly communicating with different types of wireless networks of different radio access technologies (RATs). In some implementations, transceiver 516 may be equipped with a plurality of antenna ports (not shown) such as, for example, four antenna ports. That is, transceiver 516 may be equipped with multiple transmit antennas and multiple receive antennas for multiple-input multiple-output (MIMO) wireless communications. In some implementations, apparatus 520 may also include a transceiver 526 coupled to processor 522. Transceiver 526 may include a transceiver capable of wirelessly transmitting and receiving data. In some implementations, transceiver 526 may be capable of wirelessly communicating with different types of UEs/wireless networks of different RATs. In some implementations, transceiver 526 may be equipped with a plurality of antenna ports (not shown) such as, for example, four antenna ports. That is, transceiver 526 may be equipped with multiple transmit antennas and multiple receive antennas for MIMO wireless communications.

In some implementations, apparatus 510 may further include a memory 514 coupled to processor 512 and capable of being accessed by processor 512 and storing data therein. In some implementations, apparatus 520 may further include a memory 524 coupled to processor 522 and capable of being accessed by processor 522 and storing data therein. Each of memory 514 and memory 524 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 514 and memory 524 may include a type of read-only memory (ROM) such as mask ROM, programmable ROM (PROM), erasable programmable ROM (EPROM) and/or electrically erasable programmable ROM (EEPROM). Alternatively, or additionally, each of memory 514 and memory 524 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 510 and apparatus 520 may be a communication entity capable of communicating with each other using various proposed schemes in accordance with the present disclosure. For illustrative purposes and without limitation, a description of capabilities of apparatus 510, as a UE (e.g., UE 110), and apparatus 520, as a network node (e.g., network node 125 or another network node implementing one or more network-side functionalities described above) of a wireless network (e.g., RAN 120 as a 5G/NR mobile network), is provided below.

Under various proposed schemes in accordance with the present disclosure pertaining to cross-layer optimization in XR-aware RAN to limit temporal error propagation in mobile communications, processor 522 of apparatus 520, implemented in or as a network node or server of RAN 120 implementing one or more network-side functionalities described above, may communicate, via transceiver 526, an XR traffic a UE (e.g., apparatus 510 as UE 110) with frame error concealment to limit a duration of temporal error propagation. Moreover, processor 522 may transmit, via transceiver 526, a report of failure or a request for retransmission to the UE in an event of a network transmission failure.

In some implementations, in communicating the XR traffic with the UE with the frame error concealment, processor 522 may communicate the XR traffic with the UE using an I-frame-on-demand enhancement with an early trigger. In some implementations, the I-frame-on-demand enhancement may involve demanding an I-frame in a DL transmission responsive to: (i) a failure of a last retransmission occasion; or (ii) a failure of a last-before retransmission occasion.

In some implementations, in transmitting the report of failure or the request for retransmission, processor 522 may perform either or both of the following: (i) reporting a failure of a video frame, video slice, video block or ADU transmission to a higher layer, UE application layer, XR server or video codec; and (ii) requesting a retransmission or new transmission of the video frame, video slice, video block or ADU from the higher layer, UE application layer, XR server or video codec following a network transmission failure.

In some implementations, in communicating the XR traffic with the UE with the frame error concealment, processor 522 may communicate the XR traffic with the UE using multi-layer encoding multiplexing and pose prediction multiplexing.

In some implementations, the multi-layer encoding multiplexing may involve: (a) transmitting a video frame, video slice, video block or ADU to the UE in DL and identified by a first index corresponding to a first layer and a second index corresponding to a second layer; (b) receiving from the UE in UL a selection of either the first index or the second index for a next video frame, video slice, video block or ADU; (c) receiving a pair of encoded video frames, video slices, video blocks or ADUs from an AF; and (d) transmitting to the UE one of the pair of encoded video frames, video slices, video blocks or ADUs corresponding to the selected one of the first index and second index as the next video frame, video slice, video block or ADU. In some implementations, the selection may be made in terms of one or more ADUs each of which containing a plurality of packets.

In some implementations, the pose prediction multiplexing may involve: (a) receiving from the UE in UL first and second pose predictions identified by a first index and a second index, respectively; (b) receiving a pair of encoded video frames, video slices, video blocks or ADUs from an AF; (c) receiving from the UE in UL a selection of either the first index or the second index; and (d) transmitting to the UE one of the pair of encoded video frames, video slices, video blocks or ADUs corresponding to the selected one of the first index and second index as the next video frame, video slice, video block or ADU. In some implementations, the selection may be made in terms of one or more ADUs each of which containing a plurality of packets.

In some implementations, in communicating the XR traffic with the UE, processor 522 may transmit and receive packets of the XR traffic by grouping the packets into a plurality of ADUs such that each subset of multiple packets among a plurality of subsets of the packets corresponds to a respective ADU of the plurality of ADUs. In some implementations, each subset of multiple packets in each ADU of the plurality of ADUs may map to a same deadline, a same reliability level, or a same throughput QoS requirement. In some implementations, each ADU of the plurality of ADUs may map to a tuple of QoS parameters common to all packets within that ADU, and the tuple of QOS parameters may include a deadline, a reliability level and a throughput QoS requirement.

In some implementations, in transmitting and receiving the packets of the XR traffic, processor 522 may transmit and receive the packets in a frame which is divided into the plurality of ADUs with the frame being a super-ADU, with the plurality of ADUs comprising at least a first ADU and a second ADU. In such cases, the first ADU may contain one or more packets carrying motion vectors while the second ADU may contain one or more other packets belonging to the frame.

In some implementations, the packets of the XR traffic may be grouped into the plurality of ADUs based on one or more attributes of a plurality of attributes comprising I-frame versus P-frame, FoV, one or more game control commands, haptic sensor data, in-game voice traffic, and video feed.

In some implementations, each packet of the packets of the XR traffic may carry an ADU identifier in a header of the packet. In such cases, the communicating may involve a control link conveying one or more common parameters between an AF and a 5GS. Moreover, the one or more common parameters may include either or both of an ADU deadline and an ADU reliability.

In some implementations, a plurality of QoS levels may be specified in terms of ADU parameters comprising: (i) an ADU delay budget starting from arrival of a last packet within each ADU at a UPF; (ii) an ADU maximum size; (iii) a minimum inter-arrival time of the plurality of ADUs based on a last packet within each ADU; (iv) an ADU relative arrival phase compared to other ADUs of the plurality of ADUs; and (v) an ADU reliability requirement.

Under various proposed schemes in accordance with the present disclosure pertaining to cross-layer optimization in XR-aware RAN to limit temporal error propagation in mobile communications, processor 522 of apparatus 520, implemented in or as a network node or server of RAN 120 implementing one or more network-side functionalities described above, may communicate, via transceiver 526, an XR traffic a UE (e.g., apparatus 510 as UE 110) with frame error concealment. Moreover, processor 522 may perform, via transceiver 526, parameter configuration of at least two sets of parameters for each QoS flow.

In some implementations, the two sets of parameters may include: (i) a first set of parameters specifying a guarantee for a best case of packet delivery parameters comprising a tighter PDB with a higher or relaxed bound on a PDB violation probability; and (ii) a second set of parameters specifying a guarantee for a worst case of packet delivery parameters comprising a larger PDB with a lower or stricter bound on the PDB violation probability. The rationale is that a violation of the best-case PDB parameter tends to lead to late frame decoding and, thus, may cause inefficiencies in UE power consumption or a limited degradation in quality of user experience. On the other hand, a violation of the worst-case PDB is bound to lead to more sever degradation in quality of user experience, such as missing a frame altogether and/or temporal error propagation to subsequent frames. Overall, it is believed that, by this parameter configuration method, a soft deadline may be set for packet or ADU delivery rather than a hard deadline, thereby allowing a rationalized network resource utilization by the RAN.

Illustrative Processes

Figure 6:
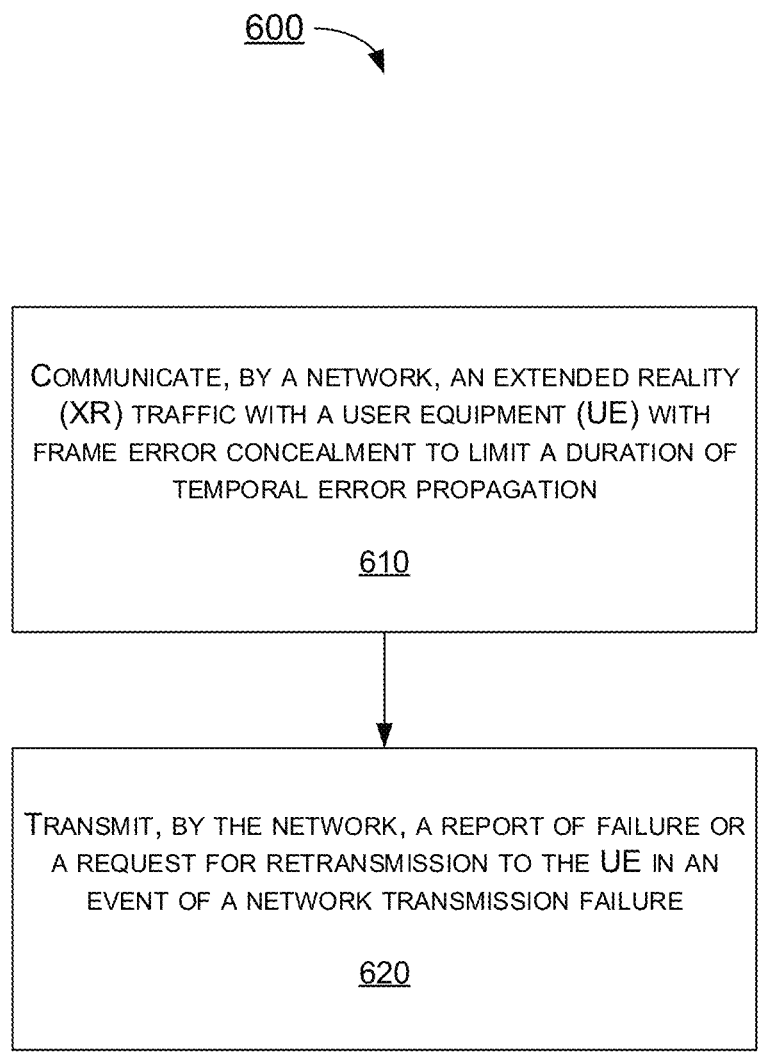
FIG. 6 is a flowchart of an example process in accordance with an implementation of the present disclosure.

FIG. 6 illustrates an example process 600 in accordance with an implementation of the present disclosure. Process 600 may represent an aspect of implementing various proposed designs, concepts, schemes, systems and methods described above, whether partially or entirely, including those pertaining to those described above. More specifically, process 600 may represent an aspect of the proposed concepts and schemes pertaining to cross-layer optimization in XR-aware RAN to limit temporal error propagation in mobile communications. Process 600 may include one or more operations, actions, or functions as illustrated by one or more of blocks 610 and 620. Although illustrated as discrete blocks, various blocks of process 600 may be divided into additional blocks, combined into fewer blocks, or eliminated, depending on the desired implementation. Moreover, the blocks/sub-blocks of process 600 may be executed in the order shown in FIG. 6 or, alternatively in a different order. Furthermore, one or more of the blocks/sub-blocks of process 600 may be executed iteratively. Process 600 may be implemented by or in apparatus 510 and apparatus 520 as well as any variations thereof. Solely for illustrative purposes and without limiting the scope, process 600 is described below in the context of apparatus 510 as a UE (e.g., UE 110) and apparatus 520 as a communication entity such as a network node or base station (e.g., network node 125 or another network node implementing one or more network-side functionalities described above) of a wireless network (e.g., RAN 120). Process 600 may begin at block 610.

At 610, process 600 may involve processor 522 of apparatus 520 communicating, via transceiver 526, an XR traffic a UE (e.g., apparatus 510 as UE 110) with frame error concealment to limit a duration of temporal error propagation. Process 600 may proceed from 610 to 620.

At 620, process 600 may involve processor 522 transmitting, via transceiver 526, a report of failure or a request for retransmission to the UE in an event of a network transmission failure.

In some implementations, in communicating the XR traffic with the UE with the frame error concealment, process 600 may involve processor 522 communicating the XR traffic with the UE using an I-frame-on-demand enhancement with an early trigger. In some implementations, the I-frame-on-demand enhancement may involve demanding an I-frame in a DL transmission responsive to: (i) a failure of a last retransmission occasion; or (ii) a failure of a last-before retransmission occasion.

In some implementations, in transmitting the report of failure or the request for retransmission, process 600 may involve processor 522 performing either or both of the following: (i) reporting a failure of a video frame, video slice, video block or ADU transmission to a higher layer, UE application layer, XR server or video codec; and (ii) requesting a retransmission or new transmission of the video frame, video slice, video block or ADU from the higher layer, UE application layer, XR server or video codec following a network transmission failure.

In some implementations, in communicating the XR traffic with the UE with the frame error concealment, process 600 may involve processor 522 communicating the XR traffic with the UE using multi-layer encoding multiplexing and pose prediction multiplexing.

In some implementations, the multi-layer encoding multiplexing may involve: (a) transmitting a video frame, video slice, video block or ADU to the UE in DL and identified by a first index corresponding to a first layer and a second index corresponding to a second layer; (b) receiving from the UE in UL a selection of either the first index or the second index for a next video frame, video slice, video block or ADU; (c) receiving a pair of encoded video frames, video slices, video blocks or ADUs from an AF; and (d) transmitting to the UE one of the pair of encoded video frames, video slices, video blocks or ADUs corresponding to the selected one of the first index and second index as the next video frame, video slice, video block or ADU. In some implementations, the selection may be made in terms of one or more ADUs each of which containing a plurality of packets.

In some implementations, the pose prediction multiplexing may involve: (a) receiving from the UE in UL first and second pose predictions identified by a first index and a second index, respectively; (b) receiving a pair of encoded video frames, video slices, video blocks or ADUs from an AF; (c) receiving from the UE in UL a selection of either the first index or the second index; and (d) transmitting to the UE one of the pair of encoded video frames, video slices, video blocks or ADUs corresponding to the selected one of the first index and second index as the next video frame, video slice, video block or ADU. In some implementations, the selection may be made in terms of one or more ADUs each of which containing a plurality of packets.

In some implementations, in communicating the XR traffic with the UE with the frame error concealment, process 600 may involve processor 522 communicating the XR traffic with the UE using QoS for late frame decoding.

In some implementations, in communicating the XR traffic with the UE, process 600 may involve processor 522 transmitting and receiving packets of the XR traffic by grouping the packets into a plurality of ADUs such that each subset of multiple packets among a plurality of subsets of the packets corresponds to a respective ADU of the plurality of ADUs. In some implementations, each subset of multiple packets in each ADU of the plurality of ADUs may map to a same deadline, a same reliability level, or a same throughput QoS requirement. In some implementations, each ADU of the plurality of ADUs may map to a tuple of QOS parameters common to all packets within that ADU, and the tuple of QoS parameters may include a deadline, a reliability level and a throughput QoS requirement.

In some implementations, in transmitting and receiving the packets of the XR traffic, process 600 may involve processor 522 transmitting and receiving the packets in a frame which is divided into the plurality of ADUs with the frame being a super-ADU, with the plurality of ADUs comprising at least a first ADU and a second ADU. In such cases, the first ADU may contain one or more packets carrying motion vectors while the second ADU may contain one or more other packets belonging to the frame.

In some implementations, the packets of the XR traffic may be grouped into the plurality of ADUs based on one or more attributes of a plurality of attributes comprising I-frame versus P-frame, FoV, one or more game control commands, haptic sensor data, in-game voice traffic, and video feed.

In some implementations, each packet of the packets of the XR traffic may carry an ADU identifier in a header of the packet. In such cases, the communicating may involve a control link conveying one or more common parameters between an AF and a 5GS. Moreover, the one or more common parameters may include either or both of an ADU deadline and an ADU reliability.

In some implementations, a plurality of QoS levels may be specified in terms of ADU parameters comprising: (i) an ADU delay budget starting from arrival of a last packet within each ADU at a UPF; (ii) an ADU maximum size; (iii) a minimum inter-arrival time of the plurality of ADUs based on a last packet within each ADU; (iv) an ADU relative arrival phase compared to other ADUs of the plurality of ADUs; and (v) an ADU reliability requirement.

Figure 7:
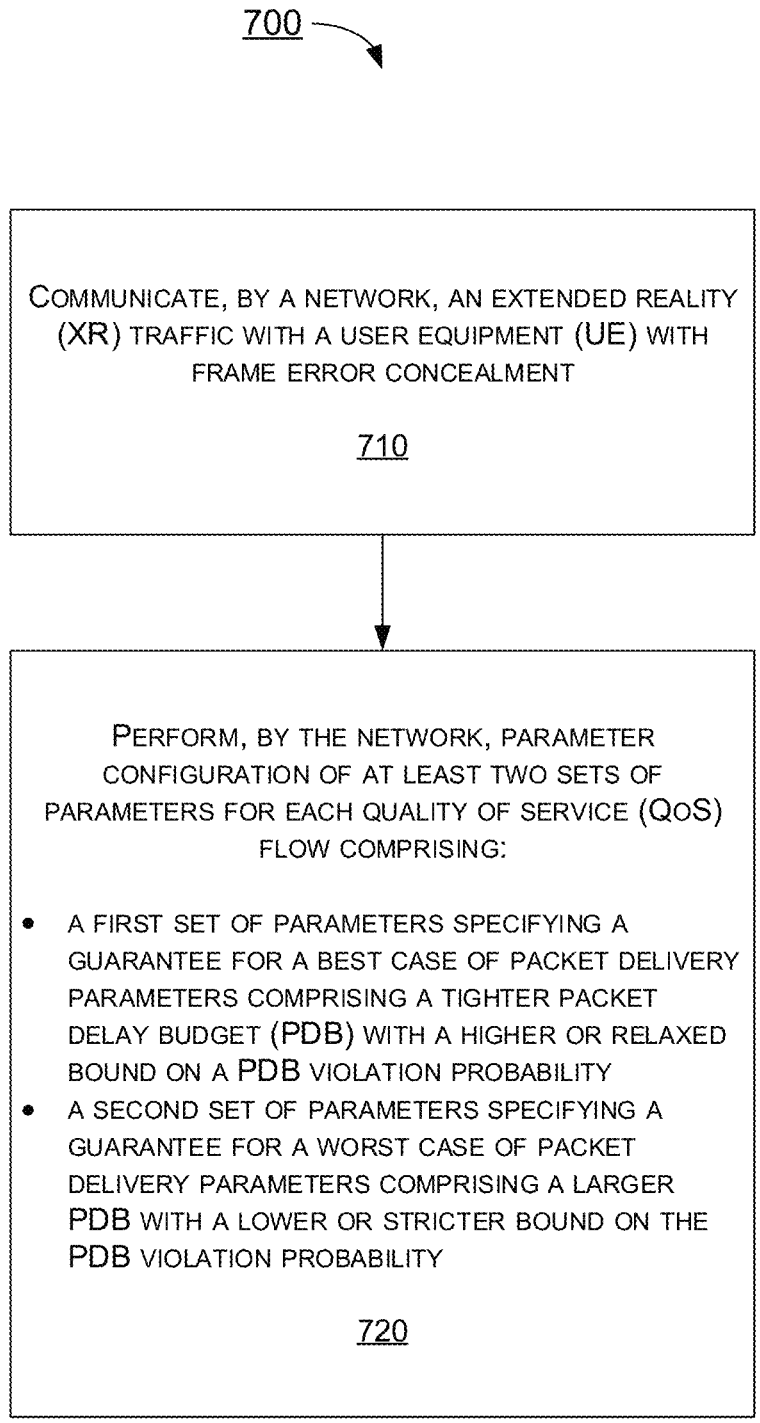
FIG. 7 is a flowchart of an example process in accordance with an implementation of the present disclosure.

FIG. 7 illustrates an example process 700 in accordance with an implementation of the present disclosure. Process 700 may represent an aspect of implementing various proposed designs, concepts, schemes, systems and methods described above, whether partially or entirely, including those pertaining to those described above. More specifically, process 700 may represent an aspect of the proposed concepts and schemes pertaining to cross-layer optimization in XR-aware RAN to limit temporal error propagation in mobile communications. Process 700 may include one or more operations, actions, or functions as illustrated by one or more of blocks 710 and 720. Although illustrated as discrete blocks, various blocks of process 700 may be divided into additional blocks, combined into fewer blocks, or eliminated, depending on the desired implementation. Moreover, the blocks/sub-blocks of process 700 may be executed in the order shown in FIG. 7 or, alternatively in a different order. Furthermore, one or more of the blocks/sub-blocks of process 700 may be executed iteratively. Process 700 may be implemented by or in apparatus 510 and apparatus 520 as well as any variations thereof. Solely for illustrative purposes and without limiting the scope, process 700 is described below in the context of apparatus 510 as a UE (e.g., UE 110) and apparatus 520 as a communication entity such as a network node or base station (e.g., network node 125 or another network node implementing one or more network-side functionalities described above) of a wireless network (e.g., RAN 120). Process 700 may begin at block 710.

At 710, process 700 may involve processor 522 of apparatus 520 communicating, via transceiver 526, an XR traffic a UE (e.g., apparatus 510 as UE 110) with frame error concealment. Process 700 may proceed from 710 to 720.

At 720, process 700 may involve processor 522 performing, via transceiver 526, parameter configuration of at least two sets of parameters for each QoS flow.

In some implementations, the two sets of parameters may include: (i) a first set of parameters specifying a guarantee for a best case of packet delivery parameters comprising a tighter packet delay budget (PDB) with a higher or relaxed bound on a PDB violation probability; and (ii) a second set of parameters specifying a guarantee for a worst case of packet delivery parameters comprising a larger PDB with a lower or stricter bound on the PDB violation probability.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
communicating, by a network, an extended reality (XR) traffic with a user equipment (UE) with frame error concealment to limit a duration of temporal error propagation; and
transmitting, by the network, a report of failure or a request for retransmission to the UE in an event of a network transmission failure;
wherein the communicating the XR traffic with the UE with the frame error concealment comprises communicating the XR traffic with the UE using multi-layer encoding multiplexing and pose prediction multiplexing;
wherein the pose prediction multiplexing involves:
receiving from the UE in uplink (UL) first and second pose predictions identified by a first index and a second index, respectively;
receiving a pair of encoded video frames, video slices, video blocks or application data units (ADUs) from an Application Function (AF);
receiving from the UE in uplink (UL) a selection of either the first index or the second index; and
transmitting to the UE one of the pair of encoded video frames, video slices, video blocks or ADUs corresponding to the selected one of the first index and second index as the next video frame, video slice, video block or ADU.

2. The method of claim 1, wherein the communicating the XR traffic with the UE with the frame error concealment comprises communicating the XR traffic with the UE using an I-frame-on-demand enhancement with an early trigger.

3. The method of claim 2, wherein the I-frame-on-demand enhancement comprises demanding an I-frame in a downlink (DL) transmission responsive to:
a failure of a last retransmission occasion; or
a failure of a last-before retransmission occasion.

4. The method of claim 1, wherein the transmitting of the report of failure or the request for retransmission comprises either or both of:
reporting a failure of a video frame, video slice, video block or application data unit (ADU) transmission to a higher layer, UE application layer, XR server or video coder-encoder (codec); and
requesting a retransmission or new transmission of the video frame, video slice, video block or ADU from the higher layer, UE application layer, XR server or video codec following a network transmission failure.

5. The method of claim 1, wherein the multi-layer encoding multiplexing involves:
transmitting a video frame, video slice, video block or application data unit (ADU) to the UE in downlink (DL) and identified by a first index corresponding to a first layer and a second index corresponding to a second layer;
receiving from the UE in uplink (UL) a selection of either the first index or the second index for a next video frame, video slice, video block or ADU;
receiving a pair of encoded video frames, video slices, video blocks or ADUs from an Application Function (AF); and
transmitting to the UE one of the pair of encoded video frames, video slices, video blocks or ADUs corresponding to the selected one of the first index and second index as the next video frame, video slice, video block or ADU.

6. The method of claim 5, wherein the selection is made in terms of one or more ADUs each of which containing a plurality of packets.

7. The method of claim 1, wherein the selection is made in terms of one or more ADUs each of which containing a plurality of packets.

8. The method of claim 1, wherein the communicating the XR traffic with the UE comprises transmitting and receiving packets of the XR traffic by grouping the packets into a plurality of application data units (ADUs) such that each subset of multiple packets among a plurality of subsets of the packets corresponds to a respective ADU of the plurality of ADUs.

9. The method of claim 8, wherein each subset of multiple packets in each ADU of the plurality of ADUs map to a same deadline.

10. The method of claim 8, wherein each subset of multiple packets in each ADU of the plurality of ADUs map to a same reliability level.

11. The method of claim 8, wherein each subset of multiple packets in each ADU of the plurality of ADUs map to a same throughput quality of service (QOS) requirement.

12. The method of claim 8, wherein each ADU of the plurality of ADUs maps to a tuple of quality of service (QOS) parameters common to all packets within that ADU, and wherein the tuple of QoS parameters comprises a deadline, a reliability level and a throughput QoS requirement.

13. The method of claim 8, wherein the transmitting and receiving of the packets of the XR traffic comprises transmitting and receiving the packets in a frame which is divided into the plurality of ADUs with the frame being a super-ADU, wherein the plurality of ADUs comprise at least a first ADU and a second ADU, and wherein the first ADU contains one or more packets carrying motion vectors while the second ADU contains one or more other packets belonging to the frame.

14. The method of claim 8, wherein the packets of the XR traffic are grouped into the plurality of ADUs based on one or more attributes of a plurality of attributes comprising I-frame versus P-frame, field of view (FoV), one or more game control commands, haptic sensor data, in-game voice traffic, and video feed.

15. The method of claim 8, wherein each packet of the packets of the XR traffic carries an ADU identifier in a header of the packet, wherein the communicating comprises a control link conveying one or more common parameters between an Application Function (AF) and a 5th Generation System (5GS), and wherein the one or more common parameters comprise either or both of an ADU deadline and an ADU reliability.

16. The method of claim 8, wherein a plurality of quality of service (QOS) levels are specified in terms of ADU parameters comprising:
 an ADU delay budget starting from arrival of a last packet within each ADU at a User Plane Function (UPF);
 an ADU maximum size;
 a minimum inter-arrival time of the plurality of ADUs based on a last packet within each ADU;
 an ADU relative arrival phase compared to other ADUs of the plurality of ADUs; and
 an ADU reliability requirement.

17. An apparatus implementable in a network, comprising:
 a transceiver configured to communicate with one or more network nodes of the network; and
 a processor coupled to the transceiver and configured to perform operations comprising:
 communicating, via the transceiver, an extended reality (XR) traffic with a user equipment (UE) with frame error concealment to limit a duration of temporal error propagation; and
 transmitting, via the transceiver, a report of failure or a request for retransmission to the UE in an event of a network transmission failure;
 wherein the communicating the XR traffic with the UE with the frame error concealment comprises communicating the XR traffic with the UE using multi-layer encoding multiplexing and pose prediction multiplexing;
 wherein the pose prediction multiplexing involves:
 receiving from the UE in uplink (UL) first and second pose predictions identified by a first index and a second index, respectively;
 receiving a pair of encoded video frames, video slices, video blocks or application data units (ADUs) from an Application Function (AF);
 receiving from the UE in uplink (UL) a selection of either the first index or the second index; and
 transmitting to the UE one of the pair of encoded video frames, video slices, video blocks or ADUs corresponding to the selected one of the first index and second index as the next video frame, video slice, video block or ADU.

* * * * *